April 30, 1968 MITSURU YAMAMOTO ET AL 3,380,683

TAPE TRANSPORT APPARATUS

Filed Sept. 7, 1966

Mitsuru Yamamoto
Thomas F. Carlin,
INVENTORS.
Harry M. Saragovitz
BY Edward J. Kelly
Herbert Berl
J. Keith Fowler United States Patent Office 3,380,683

Patented Apr. 30, 1968

3,380,683
TAPE TRANSPORT APPARATUS

Mitsuru Yamamoto, Moorestown, and Thomas F. Carlin, Cinnaminson, N.J., assignors, by mesne assignments, to the United States of America as represented by the Secretary of the Army Filed Sept. 7, 1966, Ser. No. 577,779
3 Claims. (Cl. 242—55.17)

ABSTRACT OF THE DISCLOSURE

Tape transport apparatus including a drum mounted for rotation about a vertical axis and having the lower rim flange beveled in its inner surface so as to allow thin tape to be stacked edgewise on the drum in a helix coil. An air bearing disposed between the rim flanges forces the tape to be uniformly stacked in the beveled rim flange. A second air bearing supports the drum in the area of the rim, directly opposite the first air bearing.

The present invention relates to a tape transport apparatus and more particularly to a long-playing, closed-loop, high speed, magnetic tape transport apparatus for tape recording machines.

Prior art magnetic tape recording machines and particularly the transport sections thereof have many disadvantages; for example: the requirement of two reels, the requirement of a variable r.p.m. servo-controlled reel system for constant tape velocity, and the requirement of rewinding. This invention proposes to obviate these and other disadvantages of prior art apparatus.

Therefore, an object of the present invention is to provide an improved magnetic tape transport section or apparatus for a tape recording machine which apparatus will make the machine capable of long-time, continuous recording of high frequency signal input and playback of information.

Another object of the present invention is to provide, in a transport apparatus, a tape drum having a loading or storage capacity limited only by the diameter and length of the drum, thereby permitting storage of a large amount of information in a relatively small space.

A further object of the invention is to provide a magnetic tape transport section which minimizes wear and friction on the tape.

Another object of the present invention is to provide a tape transport apparatus which requires only one storage reel or drum, thereby eliminating the need for multiple reels.

A further object of this invention is to provide a transport apparatus wherein only a constant angular velocity of the drum is required for constant tape speed, thereby obviating the requirement for a variable r.p.m. servo-controlled reel system for constant tape velocity.

A still further object of the invention is to provide a tape transport apparatus which permits continuous feed in one direction and therefore does not require rewinding.

An important feature of the present invention resides in the provision of a storage drum which is so constructed that a thin flexible strip of relatively great length can be wound thereon edgewise and maintained in operative position with the coils or loops of the strip extending parallel to each other and disposed with their transverse axes at an angle slightly less than perpendicular to the surface of the drum on which the strip is wound.

The above objects and advantages are accomplished by the present invention by the provision of an improved tape transport section utilizing a drum having one of its end flanges beveled on the inner surface thereof so as to allow the tape to be stacked or wound on the drum in a helix coil form. By stacking the thin tape on the drum in edgewise fashion, the maximum length of tape may be stored in the very minimum axial drum length. The drum is normally disposed for rotation about a vertical axis. The tape is fed onto the drum by properly positioned guides at the top of the drum and the tape is fed out at the bottom of the drum by properly positioned tape guides, the tape thereby forming a single continuous loop. The diameter of the drum and the angle of the bevel formed on the lower flange thereof controls the amount of stretch required in winding the tape onto the drum's beveled flange. In the sector of the drum which has one less layer of tape than the remaining portion, a hydrostatic air bearing is placed for forcing the stacked tape to move down one tape thickness placing the lowest layer at the bottom and providing room for the next incoming layer. To compensate for thrust load developed by moving the tape down the annular surface of the drum, a second hydrostatic air bearing is provided which supports the drum in the same sector that the other bearing imposes its load.

Other objects, features, and advantages of the invention will be apparent from the specification and claims and from the accompanying drawings, in which:

Figure 1:
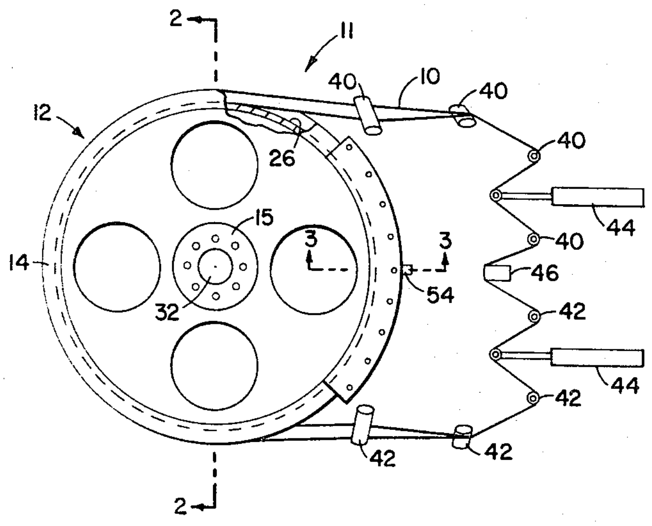
FIGURE 1 is a plan view of the tape transport apparatus according to the present invention.
Figure 2:
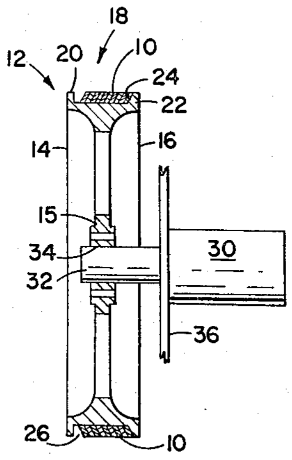
FIGURE 2 is a section taken along line 2—2 of FIGURE 1, this view depicting the drive motor and mounting means (partially shown) for the drum.

Referring to FIGURE 1, the tape transport apparatus 11 according to the present invention includes a tape storage drum 12 disposed for rotation about a vertical axis and having an upper end 14 and a lower end 16 (FIGURE 2). The annular storage area indicated generally at 18 is, thus, defined on the upper and lower ends thereof by the inner surfaces of the annular end flanges 20 and 22, respectively, and by the peripheral rim surface 26 of the drum. The radial depth of the storage area and, thus, the depth of the end flanges may vary but should be at least equal to the width of the tape 10 being stored. Likewise, the axial length of the storage area and, therefore, the length of surface 26 may vary, depending on the amount of tape to be stored. Lower end flange 22 is beveled on its inner surface as at 24 for a purpose to be described.

To rotate the tape drum, a suitable drive motor 30 is positioned below the drum (FIG. 2). The motor is supported by suitable mounting means 36 (partially shown) and has an axially extending shaft 32 operatively connected within the hub 15 of the drum for driving the latter. The shaft may be splined or otherwise secured coaxially within the axial passage 34 in the hub portion of the drum.

Figure 3:
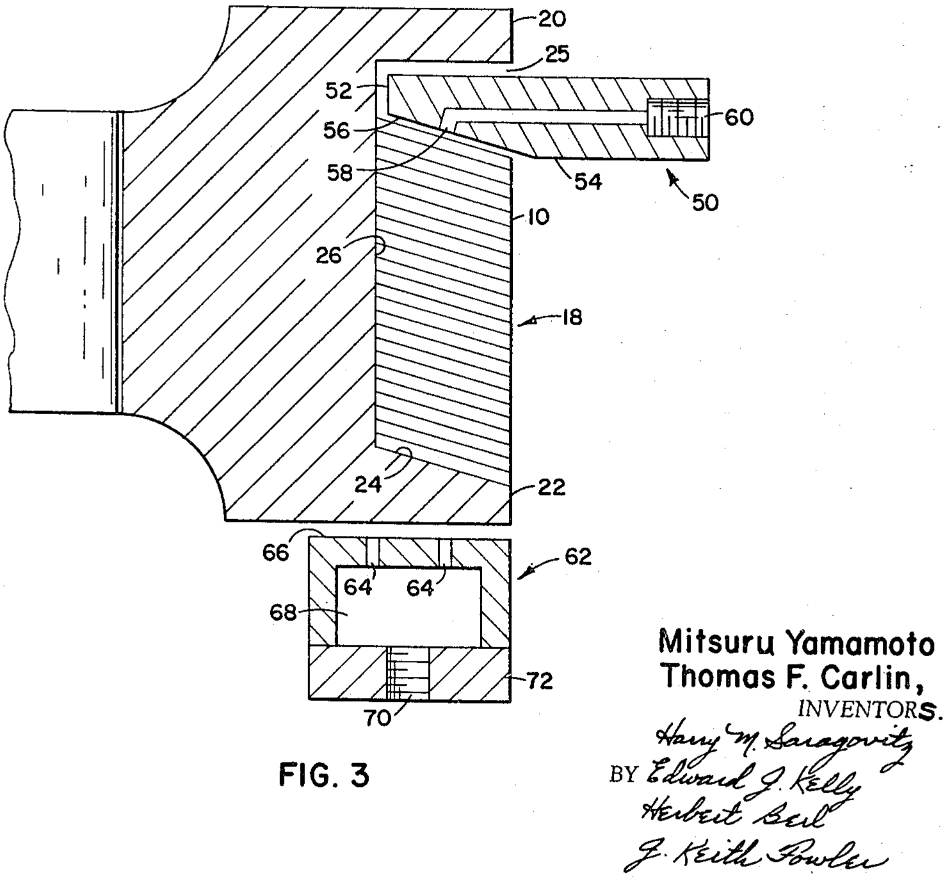
FIGURE 3 is a section taken along line 3—3 of FIGURE 1, this view illustrating the relationship of the upper and lower hydrostatic air bearings, respectively, to the stacked tape and the drum.

As depicted in the drawings, the thin tape (depicted on enlarged scale in FIGS. 2 and 3) is stacked edgewise on the drum in storage area 18, thereby permitting a relatively large amount, or long length, of tape to be stored thereon without requiring a drum of relatively long axial length. Tape is fed and guided onto the top or upper end of the drum by a plurality of properly positioned guides 40, and the tape is fed and guided out at the bottom or lower end of the drum by a plurality of properly positioned guides 42. In addition to the plural tape guides, at least a pair of tape tensioners 44, which may be of conventional type, are positioned on opposite sides of recording head means 46 for placing and maintaining the desired tension on the tape. Thus, it is apparent from FIGURE 1 that the tape forms a single, continuous loop passing through the plural guides and winding around the drum in helical fashion. Attention is directed to FIGURES 2 and 3 wherein multiple layers of tape 10 are clearly depicted (in enlarged scale) as being stacked on beveled portion 24 of flange 22 with a space 25 remaining between the first layer of tape and flange 20 for a purpose to be described.

To force the stacked tape to move down one tape thickness thereby placing the lowest layer at the bottom and providing room for the next incoming layer, an upper hydrostatic air bearing 50 is positioned within space 25 (FIGURE 3). Any convenient support means (not shown) may be provided for supporting the bearing. Air bearing 50 is arcuately shaped longitudinally (FIGURE 1) and has its inner arcuate surface 52 closely conforming with but spaced from surface 26 of the drum. This bearing is positioned (FIGURE 1) in the sector of the drum which has one less layer of tape than the remaining portion. Near the inner end of bearing 50 and on the downwardly facing side 54 thereof, a beveled surface 56 is provided. The latter surface is beveled at substantially the same angle as beveled portion 24 of drum flange 22 so as to disposed in substantially parallel relation with said portion 24 and the adjacent layer of tape. A plurality of orifices 58 are formed in a single row throughout the length of beveled surface 56 along the midportion thereof. An air inlet passage 60 is provided in the outer arcuate surface of the bearing for communication with each orifice 58. Air is supplied to the bearing from an external source (not shown). Preferably, air is supplied to each orifice 58 from a common manifold (not shown) via suitable conduit connections (not shown) to air inlet passage 60; however, bearing 50 may be provided with a built-in manifold. Hence, the single row, multiple orifice, hydrostatic air bearing is disposed and aligned to provide a uniform displacement of the stacked tape along the length of the bearing.

To compensate for any thrust load developed by moving the tape down the face of the drum, a lower hydrostatic air bearing 62 (FIGURE 3) is positioned for supporting the drum in the same sector of the drum that the upper bearing imposes its load. Convenient means (not shown) not forming a part of this invention may be provided for supporting the bearing. This lower bearing has multiple orifices 64 arranged in multiple rows along the length of inner wall 66 of the bearing. Bearing 62 has a built-in manifold 68 to supply air to orifices 64. Air is supplied to lower bearing 62 from an external source (not shown) connected by suitable connections (not shown) to air inlet passage 70 formed in lower wall 72 thereof. Preferably, air pressure is regulated at the manifold for the respective bearing. Likewise, it is preferred that each tape guide and each tape tensioner be air-lubricated and that each guide and tensioner receive regulated air from a common source regulator (not shown) in order to minimize wear and friction on the tape.

In operation of the improved tape transport apparatus, the thin magnetic tape is wound or stacked on the beveled flange of the drum in the manner illustrated, thereby permitting a relatively long length of tape to be stored on the drum in a coil of helical form while requiring the very minimum axial drum length. The motor for rotating the drum may be selectively operated as desired. Thus, the tape is fed onto the drum (at the top) by the plurality of upper air-lubricated guides and is fed out (at the bottom) by the plurality of lower air-lubricated guides. It is apparent that the diameter of the drum and the angle at which the bevel is formed on the lower flange controls the amount of stretch required in winding the tape onto the drum's beveled flange. In addition, the amount of tape that can be loaded on the drum is limited solely by the diameter and axial length of the drum storage area. Since the tape is wound on a constant diameter, only a constant angular velocity, $\omega$, of the drum is required for constant tape speed. It is thus seen that a relatively long-length, single-loop tape, capable of continuous operation in one direction, is provided. During operation, the air supply to the various bearings and guides is preferably automatically controlled as by conventional means (not shown) not forming a part of this invention. Air emitting from the upper thrust bearing directly engages the surface of the uppermost tape layer, thereby forcing the stacked tape to move down one tape thickness to move the lowest layer to the bottom and provide room for the next incoming layer. This single-row, multiple-orifice hydrostatic air bearing is aligned so as to insure a uniform displacement of the stacked tape along the length thereof. As previously stated, the lower multiple-row, multiple-orifice hydrostatic air bearing supports the drum in the same sector that the upper bearing imposes its load, thereby compensating for any thrust load developed by moving the tape down the face of the drum. Thus, the hydrostatic air-lubricated tape thrust bearings control the movement of the helical coil of stacked tape along the length of the drum in such manner as to control the amount of tension required to move the tape from the bottom of the stacked tape. It can be seen that the continuous loop of tape has its orientation changed by guides 40 and 42 during operation wherein the transverse axis of the tape is substantially vertically disposed when the same engages the recording head means and is disposed at a slight angle from the horizontal when the same is wound on the drum, flat against beveled flange 24.

Accordingly, a tape transport apparatus is provided which is capable of long-time, continuous recording of high frequency signal input. This apparatus may be used, for example, in a data processing system for long-time recording and playback of radar signal information. In practice, the apparatus according to this invention has been found particularly useful, for example, for tape velocities of approximately 1,000 in./sec. and higher and for over 10 minutes playing time.

While the transport apparatus has been described as having the storage drum disposed for rotation about a vertical axis, it should be apparent that the same is equally applicable in arrangements requiring the drum to rotate about a horizontal axis. In addition, utility of the invention is not to be limited to use in magnetic tape recording machines since the general construction and principle of operation of the apparatus has numerous other applications, e.g., moving picture projecting machines. Moreover, while the preferred embodiment of the invention herein illustrated is for handling a continuous strip in the form of an endless tape that is simultaneously fed onto and off of a supporting device, it is immaterial, so far as the broad concept is concerned, whether the strip has two ends or is in the form of an endless band.

It is to be understood that the invention is not limited to the specific embodiment herein illustrated and described but may be used in other ways without departure from its spirit and scope as defined by the following claims.

What is claimed is:

1. A tape transport apparatus for use in tape recording and the like machines for handling a relatively long, continuous length of tape, said apparatus comprising: a storage drum disposed for rotation about a vertical axis, said drum having a hub portion and a rim portion, said rim portion defining an annular storage area, said rim portion being defined by an upper annular flange at the upper end of the drum, a lower annular flange at the lower end of the drum, and an elongated annular surface between said flanges on which a continuous band of said tape is wound in the form of a helix of coils wound edgewise in a series extending in the direction of the axis of winding, said lower flange having its inner surface beveled annularly whereby the lowermost coil of tape is supported thereon, the tape being flat against said beveled surface; drive means positioned adjacent said drum and operatively connected with said hub portion for rotating said drum; guide means positioned adjacent a peripheral portion of said rim portion for simultaneously guiding said tape onto and off of said annular rim surface; said guide means including a plurality of air-lubricated tape tensioners and a plurality of air-lubricated tape guides positioned adjacent but spaced from said peripheral rim portion, the tape guides being positioned so as to change the orientation of the tape from a first orientation, when the tape is in engagement with a recording head means, wherein the transverse axis of the tape is disposed in a vertical plane, to a second orientation, when the tape is wound edgewise onto the drum annular surface, wherein the transverse axis of the tape is disposed in a plane extending at a slight angle from the horizontal and thereby parallel to the beveled surface of the lower rim flange.

2. A tape transport apparatus for use in tape recording and the like machines for handling a relatively long, continuous length of tape, said apparatus comprising: a storage drum disposed for rotation about a vertical axis, said drum having a hub portion and a rim portion, said rim portion defining an annular storage area, said rim portion being defined by an upper annular flange at the upper end of the drum, a lower annular flange at the lower end of the drum, and an elongated annular surface between said flanges on which a continuous band of said tape is wound in the form of a helix of coils wound edgewise in a series extending in the direction of the axis of winding, said lower flange having its inner surface beveled annularly whereby the lowermost coil of tape is supported thereon, the tape being flat against said beveled surface; drive means positioned adjacent said drum and operatively connected with said hub portion for rotating said drum; guide means positioned adjacent a peripheral portion of said rim portion for simultaneously guiding said tape onto and off of said annular rim surface; a first hydrostatic air bearing arcuate in shape and disposed in the sector of the drum which has one less layer of tape than the remainder, said bearing having an inner arcuate edge, said bearing being disposed with said inner edge thereof extending within the storage area of the rim spaced from but concentric with said annular surface on which the tape is wound, said bearing having an air inlet connection whereby the same may be connected to a source of air under pressure, said bearing having its downwardly facing surface beveled thereby corresponding with and being disposed parallel with the beveled surface of said lower flange, said bearing being further provided with means for directing air from the bearing against the uppermost layer of tape, said last-named means including a plurality of orifices formed approximately in the midportion of said beveled bearing surface and arranged in a single row substantially throughout the length of said bearing surface whereby the air is directed to substantially the midportion of the tape width thereby forcing the coiled tape to move down one tape thickness placing the lowest layer to the bottom and providing room for the next incoming layer.

3. A tape transport apparatus as defined in claim 2 further including: a second hydrostatic air bearing arcuate in shape and disposed in the same sector as said first bearing, said second bearing having its upper surface contiguous the outer surface of said lower rim flange, said second bearing including a built-in manifold having an air inlet passage for connection with a source of air under pressure, said second bearing further including means for directing air against said outer surface of the lower rim flange, said last-named means including a plurality of orifices formed in said inner surface and arranged in multiple rows along the length thereof whereby air is directed against the rim of the drum to compensate for thrust load imposed by said first bearing and by moving the tape down the annular surface of the drum.

References Cited

UNITED STATES PATENTS

| | | | |
|---|---|---|---|
| 1,433,190 | 10/1922 | DeVilbiss | 242—55.17 |
| 3,098,617 | 7/1963 | Day | 242—55.11 |
| 3,141,806 | 7/1964 | Reinman. | |

FOREIGN PATENTS

| | | | |
|---|---|---|---|
| 241,135 | 10/1962 | Australia. | |

BILLY S. TAYLOR, *Primary Examiner.*